United States Patent
Marueli et al.

(10) Patent No.: US 9,356,869 B2
(45) Date of Patent: May 31, 2016

(54) VOIP BANDWIDTH MANAGEMENT

(71) Applicants: Sunny Marueli, Nes Ziona (IL); Ran Shalgi, Hod Hasharon (IL)

(72) Inventors: Sunny Marueli, Nes Ziona (IL); Ran Shalgi, Hod Hasharon (IL)

(73) Assignee: VIBER MEDIA INC., Marbella (PA)

( * ) Notice: Subject to any disclaimer, the term of this patent is extended or adjusted under 35 U.S.C. 154(b) by 275 days.

(21) Appl. No.: 13/859,765

(22) Filed: Apr. 10, 2013

(65) Prior Publication Data

US 2014/0307543 A1    Oct. 16, 2014

(51) Int. Cl.
  *H04L 12/801* (2013.01)
  *H04M 7/12* (2006.01)
  *H04M 7/00* (2006.01)
  *H04M 3/22* (2006.01)

(52) U.S. Cl.
  CPC ............ *H04L 47/12* (2013.01); *H04L 47/11* (2013.01); *H04M 7/1275* (2013.01); *H04M 3/2236* (2013.01); *H04M 7/0084* (2013.01)

(58) Field of Classification Search
  CPC .................................................. H04L 28/0284
  See application file for complete search history.

(56) References Cited

U.S. PATENT DOCUMENTS

| | | | |
|---|---|---|---|
| 5,936,940 A | 8/1999 | Marin et al. | |
| 7,460,480 B2 | 12/2008 | Awais | |
| 7,668,968 B1 | 2/2010 | Smith | |
| 2003/0091029 A1 | 5/2003 | Jo et al. | |
| 2005/0232227 A1* | 10/2005 | Jorgenson | H04L 41/14 370/351 |
| 2011/0205889 A1* | 8/2011 | Chen | H04L 47/10 370/230 |
| 2011/0216648 A1* | 9/2011 | Mehrotra | H04L 47/30 370/230 |
| 2014/0043994 A1 | 2/2014 | Bansal et al. | |

FOREIGN PATENT DOCUMENTS

| | | |
|---|---|---|
| WO | WO2009008829 A1 | 1/2009 |
| WO | WO2011022104 A1 | 2/2011 |
| WO | WO2011041519 A2 | 4/2011 |

OTHER PUBLICATIONS

Chen, "Normalized Queueing Delay: Congestion Control Jointly Utilizing Delay and Marking", "IEEE/ACM Transactions on Networking, vol. 17, No. 2", pp. 618-631, Apr. 2009.*

(Continued)

*Primary Examiner* — Andrew Lai
*Assistant Examiner* — Hoyet H Andrews

(57) ABSTRACT

A computerized method of optimizing audio quality in a voice stream between a sender and a receiver VoIP applications, comprising: defining by the receiver time intervals; determining by the receiver at the end of each time interval whether congestion exists, by calculating (i) one-way-delay and (ii) trend, using double-exponential smoothing; estimating by the receiver a bandwidth available to the sender based on said calculation; sending said estimated bandwidth by the receiver to the sender; and using by the sender said bandwidth estimate as maximum allowed send rate.

8 Claims, 2 Drawing Sheets

(56) References Cited

OTHER PUBLICATIONS

Kotla, "Making a Delay-based Protocol Adaptive to Heterogeneous Environments" "2008 16th International Workshop on Quality of Service", pp. 100-109, Jun. 2-4, 2008.*

Kotla, K.; Reddy, A.L.N., "Making a Delay-Based Protocol Adaptive to Heterogeneous Environments," in Quality of Service, 2008. IWQoS 2008. 16th International Workshop on , vol. No. pp. 100-109, Jun. 2-4, 2008 doi: 10.1109/IWQOS.2008.18 URL: http://ieeexplore.ieee.org/stamp/stamp.jsp?tp=&arnumber=4539674&isnumber=4539656.*

Mingyu Chen; Fan, X.; Murthi, M.N.; Wickramarathna, T.D.; Premaratne, K., "Normalized Queueing Delay: Congestion Control Jointly Utilizing Delay and Marking,", IEEE/ACM Transactions on , vol. 17, No. 2, pp. 618-631, Apr. 2009 doi: 10.1109/TNET.2008.926508 URL: http://ieeexplore.ieee.org/stamp/stamp.jsp?tp=&arnumber=4560037&isnumber=4814854.*

\* cited by examiner

VOIP BANDWIDTH MANAGEMENT

TECHNOLOGY FIELD

The present invention relates to voice-over-Internet-Protocol (VoIP) systems, and more particularly to optimizing audio quality using adjustments of bandwidth usage.

BACKGROUND

Unlike "circuit-switched" voice, VoIP needs to work well over changing network conditions—because of competing traffic (e.g. viewing a clip on YouTube), wireless interference etc.

Some audio CODECs—e.g. Opus—support transmitting at different bitrates. In addition to using a multi-rate CODEC, one can also change the bitrate by changing the frame size and switching between CODECs.

Even with a CODEC that supports multiple bitrates (which may include changes to frame-size as above), we are still left with the problem of using the "best" bitrate given the network conditions—which requires measuring network conditions.

SUMMARY

The present invention provides a computerized method of optimizing audio quality in a voice stream between a sender and a receiver VoIP applications, comprising: defining by the receiver time intervals; determining by the receiver at the end of each time interval whether congestion exists, by calculating (i) one-way-delay and (ii) trend, using double-exponential smoothing; estimating by the receiver a bandwidth available to the sender based on said calculation; sending said estimated bandwidth by the receiver to the sender; and using by the sender said bandwidth estimate as maximum allowed send rate.

Determining whether congestion exists may comprise determining that congestion exists if the calculated one-way-delay is greater than a predefined positive constant or the calculated trend is greater than a predefined positive constant.

The method may further comprise determining congestion level based on said calculated trend value.

The method may additionally comprise determining whether bandwidth estimation should be done; and the steps of estimating, sending and using may be performed only if it is determined that bandwidth estimation should be done.

Determining whether bandwidth estimation should be done may comprise determining whether a predefined time length has elapsed since a last bandwidth estimate.

The predefined time length may be a round trip time.

Determining whether bandwidth estimation should be done may comprise determining whether congestion state has changed.

Estimating a bandwidth may comprises: a. estimating incoming bitrate; b. if there is no congestion setting the bandwidth estimate as greater than the previous estimated bandwidth; and c. if there is congestion setting the bandwidth estimate as smaller than the estimated incoming bitrate.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF EMBODIMENTS

Figure 1:
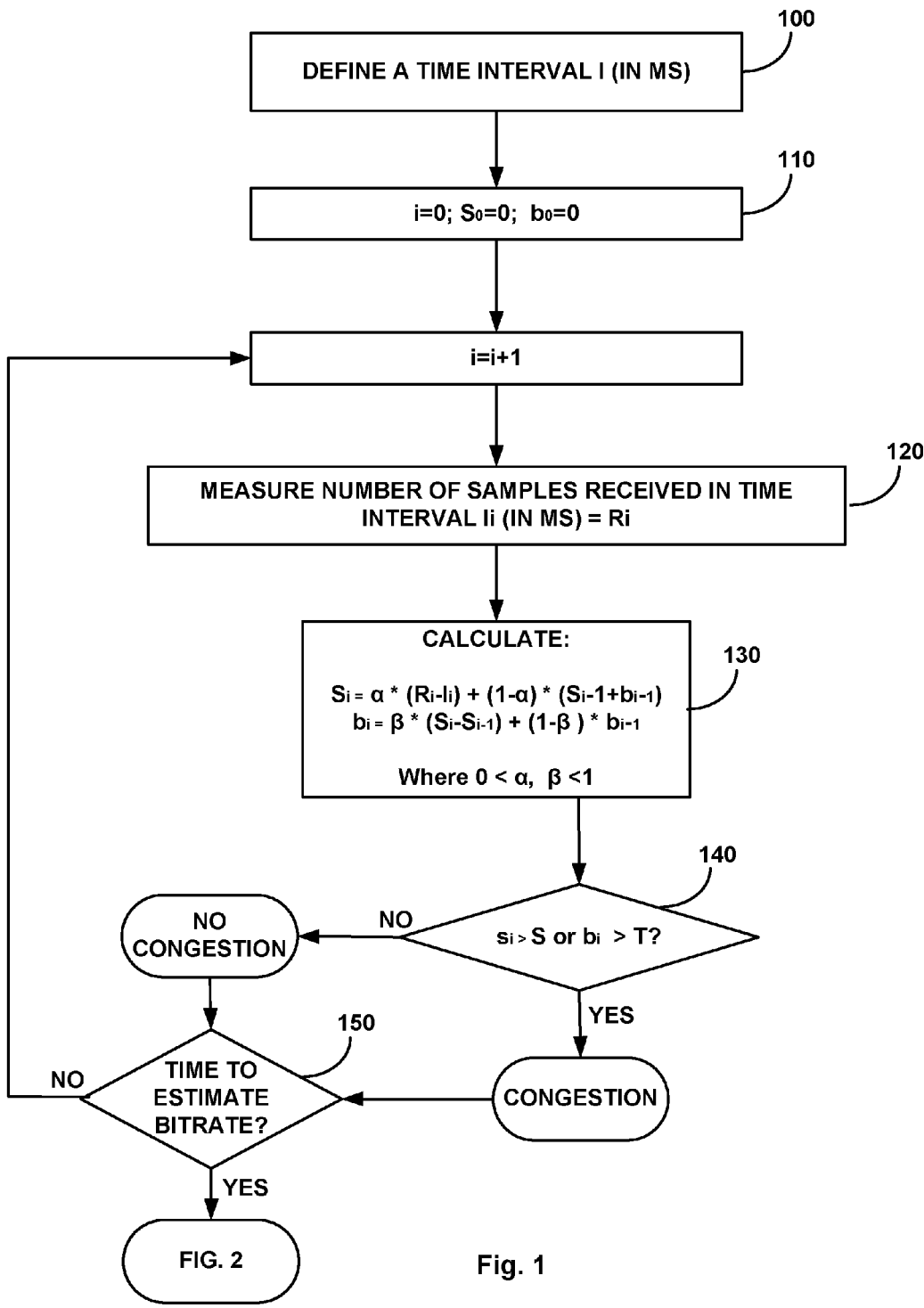
FIG. 1 is a flowchart outlining the congestion detection algorithm according to embodiments of the present invention.

To achieve the best audio quality in VoIP systems, we want to use the highest bitrate (for a given CODEC, using more bits/sec to encode the data should result in a more accurate representation of the input) while keeping the latency as low as possible.

We define latency as the delay, i.e. time it takes for the audio to travel between side 1's microphone and side 2's speakers. This contains two general components—the algorithmic delay (which for our purpose is all the time the audio spends in one VoIP application), which we will assume is fixed and the network delay. We will call the network delay from 1 to 2 the "one-way delay" (if we add the one way delay in the reverse direction, we get the "round trip delay"). In general, in a streaming application (e.g. viewing a clip on YouTube), it is OK for the delay to be of several seconds. However, in an interactive session (that is—a conversation), the perceived quality is strongly affected by the delay.

There are multiple components affecting the one-way-delay. The one that is handled by congestion avoidance protocols is the queuing delay. When packets arrive at a router faster than it can transmit them to the next hop, the packets are queued. The one-way-delay for the queued packet increases.

For example, say we have a "source" that sends 2 packets a second to a router that is connected to another link with a capacity of 1 packet per second. Assuming there is no queue initially, the first packet is released almost immediately by the router. However, the second packet arrives at 0.5 sec and has to wait until 1 sec to be transmitted. The next arrives at 1 sec and has to wait until 2 sec. The one-way delay due to queuing is 0 sec for the first packet, 0.5 sec for the 2nd, 1 sec for the third.

We use this increase in one-way-delay as a signal for congestion.

We assume each audio packet includes a timestamp (e.g. RTP packets)—this value usually increases by the number of samples in the previous packet. That is:

$$\text{timestamp}_i = \text{timestamp}_{i-1} + \text{samples}_{i-1}$$

Since the number of samples/sec is fixed (e.g. 8000 or 16000), this can be easily translated to seconds. For example, 480 samples at 16000 samples/sec=30 ms.

We assume the sender sends each packet "on time"—that is, in the previous example, the sender sends a packet every 30 ms. In the ideal case, the packets will arrive evenly spaced (that is, every 30 ms) to the receiver. However, if there is congestion we expect the reception time of packets to be larger (in the 2 packets/sec example above, the packets are sent at 0, 0.5, 1, ... but are received at 0, 1, 2, ... —that is, there is 0.5 sec between two packets sent, but 1 sec between 2 packets received).

In real IP networks, such as the Internet, this is not as simple as that: a random jitter is added to each packet, causing the delays to be longer or shorter than the "expected" times.

Let us call the time packet i is sent—$s_i$, and the time it is received $r_i$. We define interpacket delay as:

$$d_i = r_i - r_{i-1} - (s_i - s_{i-1})$$

If there is no congestion, we expect $d_i$ to be 0 on average:

$$E(d_i) = 0$$

Congestion Detection

The congestion detection algorithm according to embodiments of the present invention will now be described in conjunction with FIG. 1. To detect congestion on the receiver, the receiver's VoIP application measures the number of samples received in a predefined (step 100) fixed time interval—e.g. 120 ms. If 120 ms worth of packets are received (on average) in every 120 ms interval, then there is no congestion. However, if in a 120 ms interval less than 120 ms worth of packets are received (on average), there is congestion.

Given enough samples, it is easy to detect congestion. However, we want to detect congestion quickly—while avoiding false-positives caused by jitter.

We prefer to sample in fixed length C intervals, as this simplifies the algorithm. So, let us call the 1$^{st}$ interval (in the example, from 0 to 120 ms) $I_1$, the 2$^{nd}$ interval $I_2$, etc. and let us call the samples received in the i-th interval $R_i$ (step 120), in the same units as the interval—e.g. ms. For example, using RTP, we may convert the RTP timestamps (indicating number of samples) into time units, e.g. milliseconds, since the samples rate is usually fixed, e.g. 8000 samples/sec for a "narrow band" voice call and 90,000 samples/sec for video. We have: $I_i = C$, for all i (in the example above, C=120 ms).

To measure congestion, we use double-exponential smoothing (step 130):

$$s_i = \alpha*(R_i - I_i) + (1-\alpha)*(s_i - 1 + b_{i-1})$$

$$b_i = \beta*(s_i - s_{i-1}) + (1-\beta)*b_{i-1}$$

where, $s_0$ and $b_0$ are set to some initial value (e.g. 0) (step 110) and $0 < \alpha$, $\beta < 1$ are constants.

$s_i$ is the smoothed estimate of the one-way-delay (up to some constant) and should be 0 if there is no congestion. $b_i$ is the "trend"—a positive $b_i$ indicates an increasing delay, i.e.—congested state.

We now define congestion at the end of interval $I_i$ as:
$s_i$>threshold S, for some threshold S>0 value or
$b_i$>threshold T, for some threshold T>0 value (step 140).
We can further define several S and/or T threshold values that will indicate the degree of congestion—e.g. none, light, normal or heavy congestion.

In step 150, if the last time congestion and bitrate were calculated indicate no need to re-estimate the available bandwidth at this time, the process goes back to step 120 to measure the number of samples received in the next time interval.

Bandwidth Estimation

Figure 2:
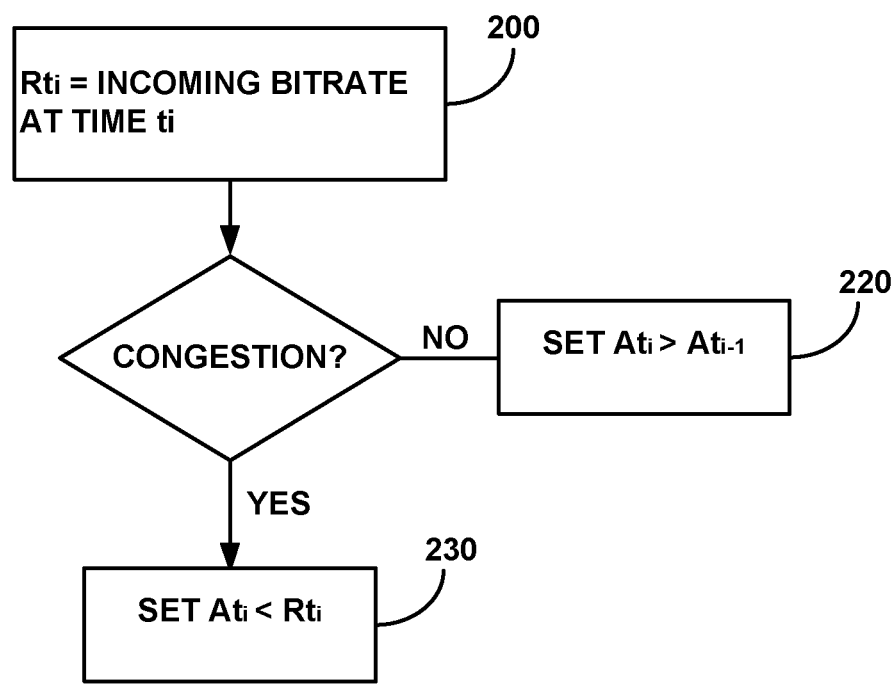
FIG. 2 is a flowchart outlining the bandwidth estimation algorithm according to embodiments of the present invention.

The bandwidth estimation algorithm will now be described in conjunction with FIG. 2. Based on the congestion estimates, the receiver's VoIP application attempts to estimate the available bandwidth for the sender and whether the sender's VoIP application should increase or decrease its sending rate.

At time t, we estimate the incoming bitrate (for example by measuring the number of bits received in the last 1 sec)–$r_t$. If the network is congested, we assume the packets are transmitted as fast as possible and therefore $r_t$ can be used as an estimate of the available bandwidth. On the other hand, if there is no congestion, the incoming rate is less than the available bitrate.

The receiver's VoIP application estimates the bandwidth available to the sender periodically, based on the most recent congestion estimate and the incoming bitrate. Let us say the bandwidth is estimated at times $t_i$, and the result is $At_i$. The initial bandwidth $At_0$ can be estimated, for example, from the incoming bitrate during an initial predefined time. Alternatively the initial bitrate may be fixed by a standard or negotiated as part of the initial handshake, or determined in any other method known in the art.

Let us call the incoming bitrate estimate at time $t_i$-$rt_i$ (step 200).

If there is no congestion, we want to increase the available bandwidth estimate (step 220). For example:
if $r_{ti} > 2*A_{ti-1}$ we can set $A_{ti} = 2/3*r_{ti}$.
Otherwise, Ati may be increased by multiplication with a constant factor:
$A_{ti} = C*A_{t-1}$ (step 230), where C>1 or by adding a constant: $A_{ti} = C + A_{t-1}$, where C>1.

Another exemplary option for increasing the available bandwidth is to remember the last available bandwidth estimate $A_{ti-1}$ and attempt to return to it quickly after a period of congestion (e.g. set the new estimate to be at least ½ of the last available estimate).

It should be noted that in some cases the bitrate may not be increased. For example:
A maximal bitrate may be defined;
The incoming bitrate from peer is (significantly) lower than the current estimate.

Alternatively, if there is congestion and assuming that the current incoming bitrate is our best bandwidth estimate, we want to reduce the bitrate (step 230) in order to resolve the congestion.

If there is light congestion, we may estimate $At_i$ as follows:

$$A_{ti} = \min(A_{ti-1}, r_{ti}) \text{ (step 240)}$$

At higher congestion levels, we may multiply the incoming bitrate by a constant (D<1) to allow for the delay to decrease (step 250). If the sender sends at full-speed, the delay will not decrease. In contrast, if the sender uses e.g. 80% of the available bandwidth, it means it is "catching up"—the queues are draining. Other methods of decreasing the estimated bandwidth may be used.

The receiver's VoIP application sends the estimates to the sender's VoIP application which will use them as the maximal send rate allowed.

The last thing we need to specify is how to determine the times to update the estimate.

Several exemplary options are:
1. Periodic update. This can be done every C (e.g. 120 ms) or more. For example, we may re-estimate the bandwidth every 1 sec. Alternatively RTCP may be used for sending the periodic updates.
2. When the congestion state shows a change—e.g. there is a change from no congestion to congestion.
3. Since it will take a round trip (receiver sends estimate to sender, then has to wait for first data with changed bitrate to arrive), every time the receiver sends an estimate, it sets up a timer for the next estimate to take place, of e.g. RTT+$\epsilon$ or $(1+\epsilon)*RTT$, where RTT is an estimate of the round-trip time and $\epsilon$ is some constant.

RTT may be measured in a number of methods such as, for example:

1. The sender's VoIP application may send an "ack" packet for the change (we assume every packet following that packet is affected by the change).
2. Each media packet may contain an encoding of the current send rate (for example, a CODEC may support 256 different send rates—the first byte of the encoded stream may be the "mode" used). The receiver can then identify when the send rate has changed.
3. Explicit RTT packets may be sent.
4. RTT may be computed from RTCP.

As an enhancement, if congestion changes significantly—an immediate bitrate estimate may be triggered.

The present invention may be implemented in various combinations of software, hardware, or firmware.

The invention claimed is:

1. A computerized method of optimizing audio quality in a voice stream of Voice over Internet Protocol (VoIP) applications between a sender and a receiver, comprising:
   defining by the receiver a plurality of time intervals for the voice stream;
   determining by the receiver at an end of each of the plurality of the defined time intervals whether congestion exists, by
   (i) calculating a one-way-delay for each of a first plurality of received audio packets in the voice stream and
   (ii) using double exponential smoothing to calculate a one-way-delay trend of the first plurality of received audio packets;
   estimating by the receiver a bandwidth available to the sender based on a result of said one-way-delay trend calculation;
   sending by the receiver said estimated bandwidth to the sender; and
   using by the sender said estimated bandwidth received by the sender as maximum allowed send rate for a second plurality of audio packets in the voice stream of the VoIP applications.

2. The method of claim 1, wherein said determining whether congestion exists comprises determining that congestion exists if the calculated one-way-delay is greater than a first predefined positive constant or the calculated one-way-delay trend is greater than a second predefined positive constant.

3. The method of claim 2, further comprising determining congestion level based on a value of said calculated one-way-delay trend.

4. The method of claim 1, additionally comprising a step of determining whether a bandwidth estimation should be done; and wherein said estimating, sending and using are performed only if it is determined that said bandwidth estimation should be done.

5. The method of claim 4, wherein said determining whether said bandwidth estimation should be done comprises determining whether a predefined time length has elapsed since a previous bandwidth estimation was done.

6. The method of claim 5, wherein said predefined time length is a round trip time.

7. The method of claim 4, wherein said determining whether said bandwidth estimation should be done comprises determining whether congestion state has changed.

8. The method of claim 1, wherein said bandwidth estimation comprises:
   a. estimating an incoming bitrate of the voice stream;
   b. if it is determined there is no congestion, setting the estimation of the bandwidth at a value greater than the estimated incoming bitrate; and
   c. if it is determined there is congestion, setting the estimation of the bandwidth at a value smaller than the estimated incoming bitrate.

* * * * *